Nov. 8, 1932. T. WERNER ET AL 1,886,858
METHOD OF PRODUCING CANDY CENTERS AND TO CANDY
CENTER MAKING MACHINE EMPLOYING SUCH METHOD
Filed May 31, 1930 3 Sheets-Sheet 3
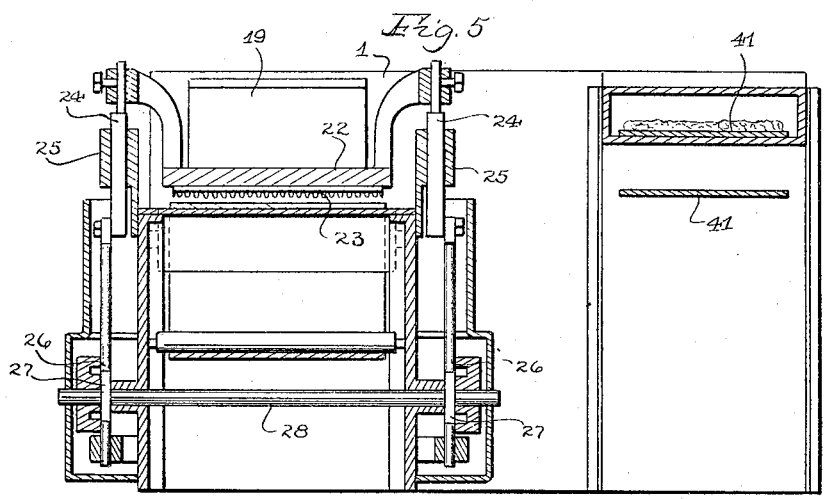
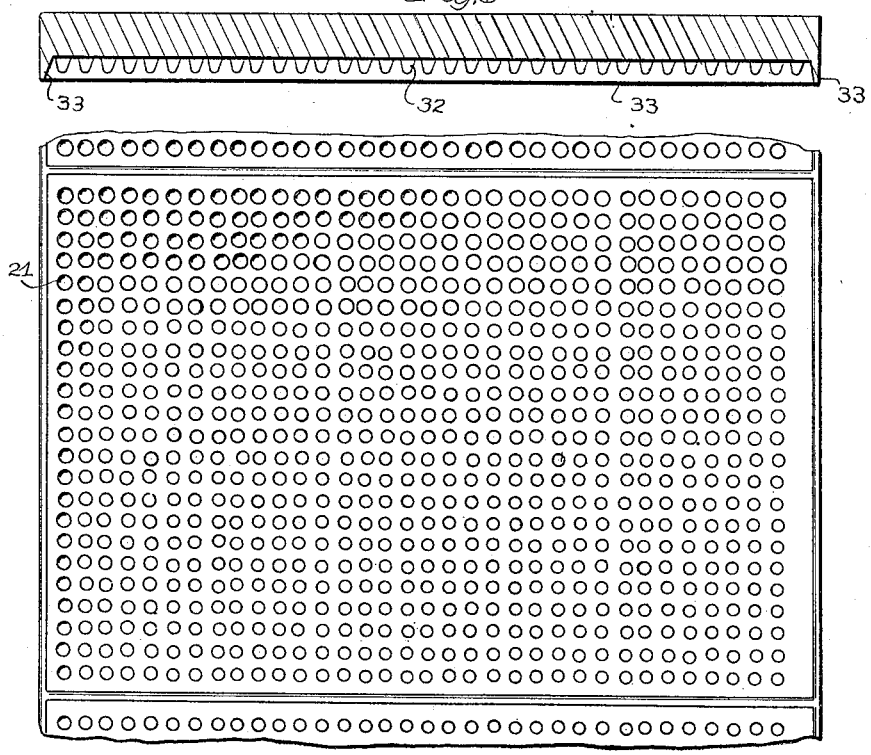
INVENTOR
Theodore Werner and Charles Werner
BY
their ATTORNEY Patented Nov. 8, 1932

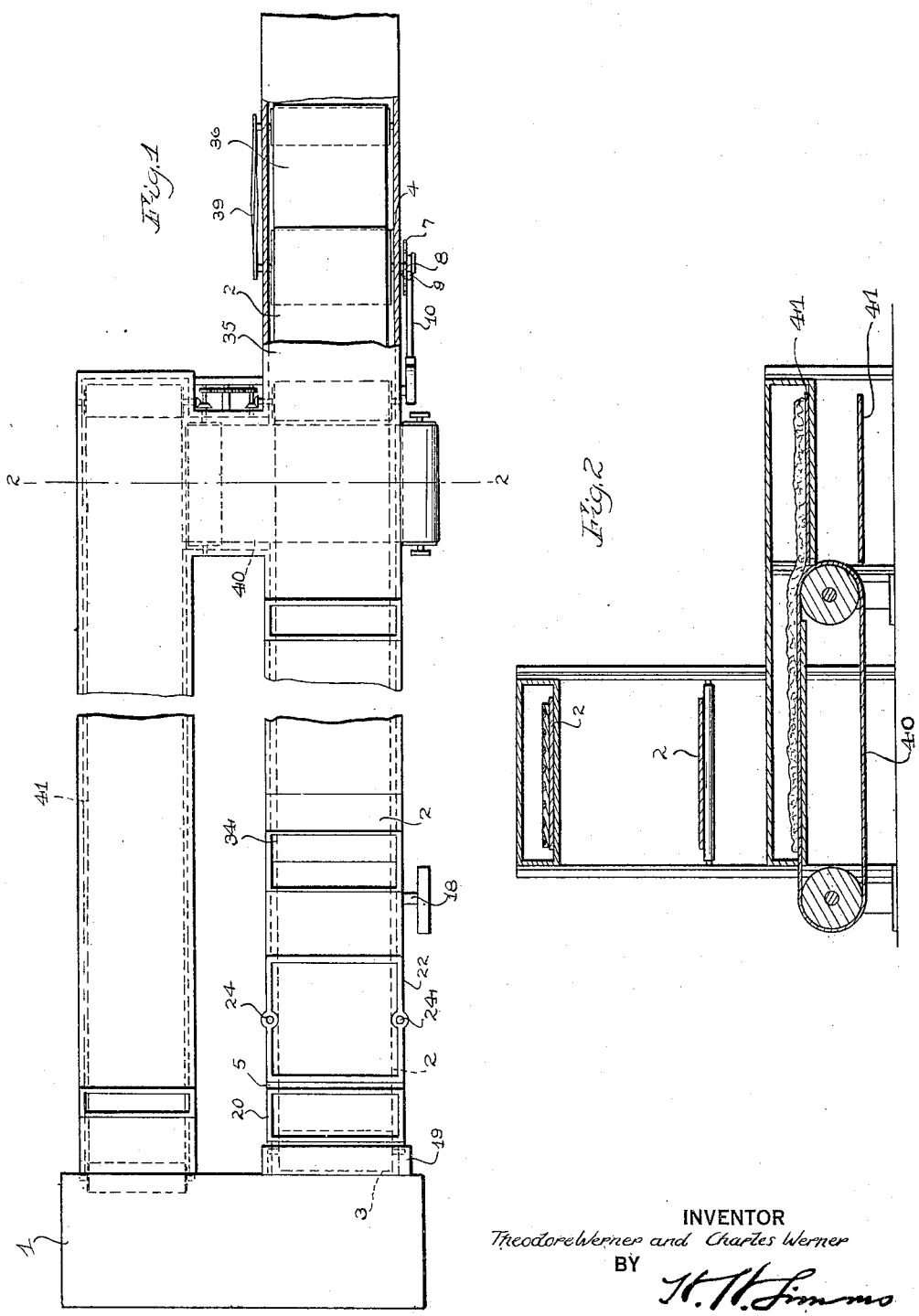

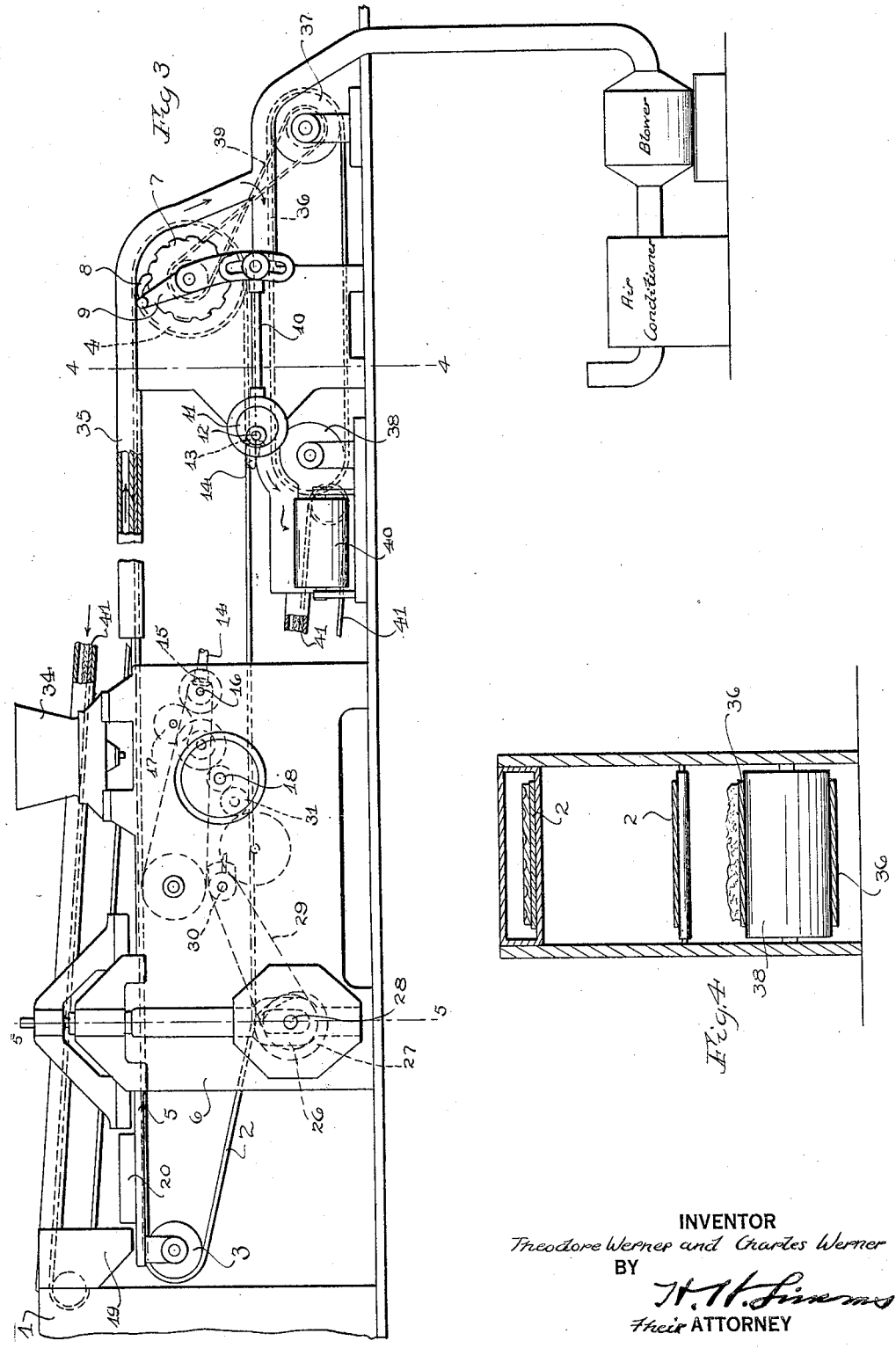

1,886,858

UNITED STATES PATENT OFFICE

THEODORE WERNER AND CHARLES WERNER, OF ROCHESTER, NEW YORK, ASSIGNORS TO JOHN WERNER & SONS, INC., OF ROCHESTER, NEW YORK, A CORPORATION OF NEW YORK

METHOD OF PRODUCING CANDY CENTERS AND TO CANDY CENTER MAKING MACHINE EMPLOYING SUCH METHOD

Application filed May 31, 1930. Serial No. 458,089.

The present invention relates to a method of producing candy centers and to candy center making machines employing such method, this application being a continuation in part of an application filed by us May 13, 1929, Serial No. 364,160.

An object of this invention is to make it possible to dispense with the trays heretofore employed in machines of this type, as well as to reduce the floor space and the amount of comminuted molding material or starch heretofore required.

Another object of this invention is to make it possible to produce candy centers in a much shorter period of time.

To these and other ends, the invention consists of certain parts and combinations of parts all of which will be hereinafter described: the novel features being pointed out in the appended claims.

In the drawings:

Fig. 1 is a plan view of a machine embodying this invention;

Fig. 2 is a section on the line 2—2, Fig. 1;

Fig. 3 is a side view of the same machine;

Fig. 4 is a section on the line 4—4, Fig. 3;

Fig. 5 is a section on the line 5—5, Fig. 3;

Fig. 6 is an enlarged section through the printing member; and

Fig. 7 is a fragmentary plan view of the endless belt after the molding material has been deposited on the endless belt and has been printed.

At the present time the making of candy centers is effected by depositing the candy centers in molding trays moving past a depositor, and then placing the molding trays with the candy centers therein in a drying or conditioning room over night, until the candy centers are set and the starch partially conditioned. Thereafter the molding starch and candy centers are separated and the starch used again for molding other centers. After a number of days, dependent upon local conditions, the starch is treated to place it in its original condition. This arrangement not only requires a large number of trays at considerable expense, but it requires a large room to store the trays, and a large amount of molding starch.

This invention obviates these and other disadvantages of the known system.

In the illustrated embodiment of the invention, 1 indicates a starch buck (a machine of known construction) which receives the starch and the candy and separates the two.

From the starch buck the starch passes to an endless carrier on which it is printed or shaped to provide the molds. In this instance, this endless carrier is in the form of a belt 2 which passes about a pulley 3 at the front forward end of the machine and about a pulley 4 at the rear end of the machine. The upper lap of the belt travels over a table 5 arranged on a frame 6.

The endless belt, in this instance, advances by a step by step movement which is preferably effected by providing a toothed wheel 7 on the shaft of the pulley 4 and engaging said wheel by a pivoted pawl 8 on a swinging member 9 turning about the axis of rotation of the wheel 7. This swinging member is moved by a pitman 10 which connects with an eccentric 11 on a shaft 12. The latter is driven through a bevel gearing 13 from a shaft 14 which connects by a bevel gearing 15 with a shaft 16. The shaft 16 through a gearing 17 connects with the drive shaft 18.

The starch from the starch buck 1 is deposited on the endless carrier by means of the discharge spout 19 and is leveled on the belt by a leveling device 20 of any suitable construction.

From the leveling device the starch containing portion of the belt passes to the printing machine which will compress the starch and form mold pockets 21 therein. This printing or molding forming mechanism, in this instance, embodies a head 22 carrying the printing device 23 and supported at opposite sides by guide rods 24 movable on fixed guides 25. The guide rods have adjacent their lower ends yokes 26 which operate by cams 27 on a shaft 28 which by a belt 29 operates from a shaft 30. The latter through a gear 31 connects with the drive shaft 18.

The printing member, in this instance, is a flat plate provided on the under side thereof with a plurality of projections 32 and a surrounding marginal flange 33 the inner wall of which converges inwardly. This flange projects beyond the ends of the projections 32 so that it will engage the leveled starch in advance of the projections and will prevent the starch spreading as the molding projections are being forced into the starch, thus giving to the molded starch a compressed condition.

The belt or carrier now moves the molded starch to the candy depositor 34 which deposits hot candy for the centers into the mold pockets of the starch.

At the time the candy is deposited into the starch, it is preferred to have the latter dry and at a desired temperature, say 50° Fahrenheit, more or less. The candy and starch together now travel on the endless carrier to and through a conditioning means, to set the candy in the starch, remove excess moisture and vary the temperature of the starch to meet working conditions. This conditioning means comprises, in this instance, a housing or casing 35 which surrounds the endless carrier extending from the depositor beyond the discharge end of the endless carrier. Air is circulated through this conditioning means, and this air may be refrigerated or warm air dehumidified or otherwise of a desired temperature. The candy passes from the depositor about 140° Fahrenheit and strikes the cold starch at about 40° Fahrenheit. The cold air in the conditioning apparatus expands from the heat of the candy and takes moisture from the candy and the starch thereby forming a crust on the candy. In the present instance, the candy and starch molding material travel together about 7½ to 10 minutes through the conditioner before the discharge end of the endless carrier is reached, when the candy and starch are jumbled or mixed together in falling upon an endless carrier 36 which lies directly beneath the endless carrier 2 within the conditioning casing 35, its receiving end being projected beyond the discharge end of the carrier 2. This endless carrier 36 passes about two pulleys 37 and 38 and is driven from the shaft of the pulley 4 by a belt 39.

The candy and starch jumbled together return on the carrier 36 toward the front end of the machine until transversely operating carrier 40 is reached when the jumbled material is deposited on the carrier 40 which moves the material toward and onto another endless carrier 41 which extends longitudinally of and to one side of the carrier 2. This carrier 41 carries the jumbled candy and starch upwardly and forwardly and deposits them into the intake of the starch buck 1 which separates the candy from the starch and returns the starch to the endless belt 2. The endless carriers 2, 36, 40 and 41 travel preferably at the same surface speed and all of them are preferably enclosed in the casing of the conditioning apparatus so as to be subjected to the conditioning air which also is effective in the starch buck due to the connection of the latter with the casing.

This invention makes it possible to mold candy centers at less cost and less time than heretofore, the expense of a large number of trays and their up-keep or repair is eliminated. The floor space required is materially less as it is not required to store the candy in the starch trays overnight. The amount of starch required is materially reduced as the starch is in continuous use and is not required to be inactive in a large number of stored trays. The conditioning of the starch takes place immediately the candy centers are deposited therein. The conditioning of the starch is effected completely before it is separated from the candy centers.

What we claim as our invention and desire to secure by Letters Patent is:

1. A candy molding machine having an endless surface on which the molding material directly rests, and having a printing member provided with a surrounding flange for confining the molding material while the printing member is acting on the material confined by the flange, and means for depositing candy in the molds formed by the printing member.

2. A candy molding machine having an endless surface on which the molding material directly rests, and having a printing member provided with a surrounding flange for confining the molding material while the printing member is acting on the material confined by the flange, the inner face of the flange being inclined, and means for depositing candy in the molds formed by the printing member.

3. A candy molding machine comprising an endless carrier having a continuous level molding material supporting surface, means for feeding molding material to said surface, means for leveling the molding material on successive portions of the surface, means for printing successive portions of the molding material, and means for depositing candy successively in molds formed by the printer.

4. The method of producing candy centers which comprises depositing the hot candy in molds formed of comminuted material, cooling the candy while in such molds until the candy is set, jumbling the candy and the molding material, cooling the jumbled material and separating the candy from the molding material.

5. The method of producing candy centers which comprises depositing the soft candy in molds formed of comminuted material, immediately conditioning the candy and the molding material to set the candy, jumbling the molding material and the candy, continuing the setting of the candy and the conditioning of the molding material while both are in a jumbled condition, and separating the candy and the molding material.

6. The method of producing candy centers which comprises depositing the soft candy in molds formed of comminuted material immediately conditioning the candy and the molding material to set the candy, jumbling the molding material and the candy, continuing the setting of the candy and the conditioning of the molding material while both are in a jumbled condition, separating the candy and the molding material, and reforming molds in the molding material while it is in the conditioned state.

7. The combination with an endless carrier, of a candy and molding material separating machine feeding molding material to the endless conveyor, a leveling device acting on the molding material deposited on the endless carrier, a printing mechanism for forming molds in the molding material moved by such carrier, a candy depositor for depositing candy in the molds, transfer means receiving the candy and molding material from the endless carrier in a jumbled condition and transferring it to the separating machine, and means for conditioning the candy and the molding material substantially from the time it passes from the candy depositor to the separating machine.

8. In a candy molding machine, the combination with a separating means for the molding material and the candy having a discharge for the molding material, and an intake for the candy and the molding material, conveying means extending between the discharge and the intake, leveling means for leveling the molding material on the conveying means, a printer for forming mold pockets in the molding material on the conveying means, a candy depositor for depositing candy in the molds thus formed, and conditioning means acting on the candy and molding material during their travel from the depositor to the separating machine.

9. In a candy center molding machine, the combination with a separating machine for the molding material and the candy having an intake for the candy and the molding material, and a discharge for the molding material, a leveler, a molding means, and a candy depositor, of a conveying mechanism on which the molding material is deposited extending between the intake and the discharge for operation upon by the leveler, the stamping means and the candy depositor, and having means for effecting the jumbling of the candy and the molding material between the candy depositor and the separator.

10. In a candy center molding machine, the combination with a separating machine for the molding material and the candy having an intake for the candy and the molding material, and a discharge for the molding material, a leveler, a molding means, and a candy depositor, of a conveying mechanism on which the molding material is deposited extending between the intake and the discharge for operation upon by the leveler, the stamping means and the candy depositor, and having means for effecting the jumbling of the candy and the molding material between the candy depositor and the separator, and means for conditioning the candy and the molding material between the candy depositor and the separator.

11. A candy molding machine comprising a depositor for finely divided molding material, an endless member having a continuous level receiving surface for the molding material at least as wide as the discharge of the molding material depositor so that material from said depositor is deposited on said continuous surface as the latter travels past said depositor, a leveler for leveling the material on the endless member to provide an unbroken body of molding material, a printer acting on said unbroken body of molding material to provide molding pockets therein, and a candy depositor for depositing candy into the mold pockets, the molding material and candy dropping off one end of the endless member with a jumbled mass to break up the molding material and cushion the fall of the candy by such jumbled mass of molding material.

12. The method of molding in starch-like material which consists in spreading a layer of the material on suitable support, in forcing mold-forming elements into a portion of said layer in a direction towards said support to form mold recesses, and in temporarily confining said portion against movement in directions laterally with respect to the direction of the movement of the mold forming elements during the mold forming operation.

13. The method of forming mold recesses in starch-like material, consisting in spreading a layer of such material on a suitable support, in temporarily confining a portion of said layer within enclosing side walls, in forcing mold-forming elements into the confined portion of said layer in a direction towards said support to form the mold recesses, and in thereafter withdrawing said elements and removing the enclosing side walls.

14. Apparatus for forming molds in starch-like material, comprising, a belt conveyor, means for depositing said material directly on the surface of said belt conveyor, means movable toward and away from said conveyor for periodically forming mold recesses in said material, and means affording a skeleton sidewall enclosure and cooperating with the conveyor during the mold forming operation to confine said material along all sides.

15. Apparatus for forming molds in starch-like material, comprising a support, means for depositing said material on said support and for spreading it in a layer of substantially even depth thereon, means for temporarily dividing off a portion of said layer and confining it along all sides, and means movable toward said support into said divided-off portion, while confined by said means, for forming the molds.

16. Apparatus for forming molds in starch-like material, comprising a travelling support, means for depositing said material thereon and forming it into a layer of substantially even depth, and means intermittently movable into said layer to successively divide off portions thereof and enclose each such portion along all sides, and means intermittently operable to successively form mold recesses in the divided-off portions while confined by said means.

17. Apparatus for forming molds in starch-like material, comprising a support for a layer of such material, and a member having a depending and endless flange forming an enclosure, mold patterns depending from said member and dispose within said enclosure, and means for moving said member toward said support to press a portion of said layer therebetween and form imprints of the patterns therein, said flange also entering said layer and confining the sides of said portion during the mold forming operation.

18. Apparatus for forming molds in starch-like material, comprising, substantially parallel members relatively movable toward and away from one another to press a layer of said material therebetween, mold forming patterns carried by one of said members to form mold recesses in one face of the material pressed between said members, and means carried by one of said members affording an upstanding and endless wall, said means operable on relative movement of said members toward one another to enter said layer of material and mark off a portion of the layer from the rest, said means so disposed as to completely encompass the pattern members when pressed into said portion and confine the sides of said portion during the mold forming operation.

19. Apparatus for forming molds in starch-like material, comprising a substantially horizontally disposed support for a layer of said material, a similarly disposed presser member movable toward and away from said support, a series of patterns depending from the presser member, and a depending flange on said member surrounding all the pattern members, said flange being of wedge shaped cross section and oppositely disposed inner faces of said flange diverging away from the presser member.

THEODORE WERNER.
CHARLES WERNER.